(12) United States Patent
Liu

(10) Patent No.: US 10,718,398 B2
(45) Date of Patent: Jul. 21, 2020

(54) METHOD AND DEVICE FOR IDENTIFYING AN ACTION

(71) Applicants: Beijing Xiaomi Mobile Software Co., Ltd., Beijing (CN); Beijing Smartmi Technology Co., Ltd., Beijing (CN)

(72) Inventor: Dongxu Liu, Beijing (CN)

(73) Assignees: Beijing Xiaomi Mobile Software Co., Ltd., Beijing (CN); Beijing Smartmi Technology Co., Ltd., Beijing (CN)

(*) Notice: Subject to any disclaimer, the term of this patent is extended or adjusted under 35 U.S.C. 154(b) by 332 days.

(21) Appl. No.: 15/891,926

(22) Filed: Feb. 8, 2018

(65) Prior Publication Data

US 2018/0252291 A1    Sep. 6, 2018

(30) Foreign Application Priority Data

Mar. 1, 2017  (CN) .......................... 2017 1 0118183

(51) Int. Cl.
*F16F 15/00*  (2006.01)
*G06F 1/16*  (2006.01)
(Continued)

(52) U.S. Cl.
CPC ............ *F16F 15/002* (2013.01); *F04D 27/00* (2013.01); *G01H 1/006* (2013.01); *G01H 1/04* (2013.01);
(Continued)

(58) Field of Classification Search
CPC ...... F16F 15/002; G06F 3/017; G06F 3/0346; G06F 1/1694; F04D 27/00; G01H 1/04; G01H 1/006; G01H 17/00
See application file for complete search history.

(56) References Cited

U.S. PATENT DOCUMENTS

2010/0194682 A1   8/2010  Orr et al.
2013/0147709 A1   6/2013  Kim et al.
(Continued)

FOREIGN PATENT DOCUMENTS

CN   103604439 A   2/2014
CN   103645845 A   3/2014
(Continued)

OTHER PUBLICATIONS

English Machine Translation of Su et al, CN105179286A, 2015 (Year: 2015).*

(Continued)

*Primary Examiner* — David Z Huang
(74) *Attorney, Agent, or Firm* — Arch & Lake LLP

(57) ABSTRACT

The present disclosure relates to methods and devices for identifying an action. In some embodiments, a method for identifying an action includes: recording vibration trajectory information, wherein the vibration trajectory information corresponds to vibration of at least a portion of an intelligent device from a start of a vibration event to stabilization of the vibration event; determining whether the vibration is a damping vibration based on the vibration trajectory information; and in response to determining that the vibration is a damping vibration, determining that the vibration is caused by a user's trigger action, or in response to determining that the vibration is not a damping vibration, determining that the vibration is not caused by the user's trigger action.

17 Claims, 6 Drawing Sheets

(51) Int. Cl.
| | |
|---|---|
| *G06F 3/0346* | (2013.01) |
| *F04D 27/00* | (2006.01) |
| *G06F 3/01* | (2006.01) |
| *G01H 1/00* | (2006.01) |
| *G01H 1/04* | (2006.01) |
| *G05B 19/02* | (2006.01) |
| *H04L 12/28* | (2006.01) |

(52) U.S. Cl.
CPC ........... *G05B 19/02* (2013.01); *G06F 1/1694* (2013.01); *G06F 3/017* (2013.01); *G06F 3/0346* (2013.01); *H04L 12/282* (2013.01); *G06F 2200/1636* (2013.01)

(56) References Cited

U.S. PATENT DOCUMENTS

2016/0139169 A1   5/2016   Yasuda
2017/0364152 A1*  12/2017  Matsuda .................. G06F 3/014

FOREIGN PATENT DOCUMENTS

| CN | 105022568 A | 11/2015 |
|---|---|---|
| CN | 105179286 A * | 12/2015 |
| CN | 105491297 A | 4/2016 |
| CN | 105677192 A | 6/2016 |
| CN | 106126082 A | 11/2016 |
| CN | 106438439 A | 2/2017 |
| EP | 3267287 A1 | 1/2018 |
| KR | 20120007615 A | 1/2012 |
| TW | 201101137 A | 1/2011 |
| WO | 2016139798 A1 | 9/2016 |

OTHER PUBLICATIONS

Second Office Action to Chinese Application No. 201710118183.0, dated May 24, 2019, and Concise Explanation in English (8p).
First Office Action issued in corresponding Chinese Application No. 201710118183.0, dated Dec. 11, 2018, 7 pages.
Chen, YinCong "College Physics" Jun. 30, 2016, pp. 141-142.
Extended European Search Report issued in corresponding European Application No. 18155600.2, dated Jul. 10, 2018, 11 pages.
Every Review: "VH Ultra Quiet USB Powered Portable Desk Fan, Touch Switch with Smart Sensor," YouTube, Aug. 7, 2016, pp. 1-2, Retrieved from the Internet: URL: https://www.youtube.com/watch?v=6jjvfLPEj8w [retrieved on Jun. 8, 2018].

* cited by examiner

METHOD AND DEVICE FOR IDENTIFYING AN ACTION

CROSS-REFERENCE TO RELATED APPLICATION

The present application is based on and claims priority under 35 U.S.C. § 119 to Chinese Patent Application No. 201710118183.0, filed on Mar. 1, 2017, which is hereby incorporated by reference herein in its entirety.

TECHNICAL FIELD

The present disclosure relates to the field of communication technology, and more particularly to methods and devices for identifying an action of a household appliance.

BACKGROUND

Electrical fans are household appliances that utilize a motor to drive rotation of fan blades in order to speed up air flow, and in turn achieve air circulation and cooling. Every summer, electrical fans are used to provide air cooling for humans with lower energy consumption than air conditioners.

SUMMARY

In accordance with some embodiments of the disclosed subject matter, methods and devices for identifying an action are provided. Various technical solutions are described below.

In accordance with some embodiments of the disclosed subject matter, a method is provided for identifying an action. The method may be used for interactive control of an intelligent device. The method may include: recording vibration trajectory information, wherein the vibration trajectory information corresponds to vibration of at least a portion of an intelligent device from a start of a vibration event to stabilization of the vibration event; determining whether the vibration is a damping vibration based on the vibration trajectory information; and in response to determining that the vibration is a damping vibration, determining that the vibration is caused by a user's trigger action, or in response to determining that the vibration is not a damping vibration, determining that the vibration is not caused by the user's trigger action.

In some embodiments, the determining whether the vibration is a damping vibration based on the vibration trajectory information comprises: determining, based on the vibration trajectory information, position information of n first peaks and n first troughs of the vibration trajectory information in time order, wherein n is a positive integer; determining, based on the position information of the n first peaks and the n first troughs, n first amplitude distances between respective adjacent peaks and troughs in amplitude direction; determining whether the n first amplitude distances successively decrease in time order; and in response to determining that the n first amplitude distances successively decrease in time order, determining that the vibration is a damping vibration, or in response to determining that at least one of the n first amplitude distances does not successively decrease in time order, determining that the vibration is not a damping vibration.

In some embodiments, the determining whether the n first amplitude distances successively decrease in time order comprises: determining that the first amplitude distance of the n first amplitude distances is greater than a preset distance; and in response to determining that the first amplitude distance is greater than the preset distance, performing the determining whether the n first amplitude distances successively decrease in time order.

In some embodiments, the determining, based on the vibration trajectory information, position information of the n first peaks and the n first troughs of the vibration trajectory information in time order comprises: determining the total number of all peaks and troughs represented in the vibration trajectory information; determining that the total number of all the peaks and the troughs represented in the vibration trajectory information is greater than or equal to 2n; and in response to determining that the total number of all the peaks and the troughs represented in the vibration trajectory information is greater than or equal to 2n, performing the determining the position information of the n first peaks and the n first troughs of the vibration trajectory information in time order.

In some embodiments, the recording vibration trajectory information comprises: collecting, using an accelerometer, vibration trajectory information vibrations in a preset direction.

In some embodiments, the intelligent device is an electric fan comprising a fan head that rotates about a central axis.

In some embodiments, the preset direction is a direction parallel to the central axis.

In some embodiments, the method further comprises, in response to determining that the vibration is caused by the user's trigger action, performing an operation to toggle a power state of the electric fan.

In some embodiments, the method further comprises, in response to determining that the vibration is caused by the user's trigger action, performing an operation to change a speed at which the fan head rotates about the central axis.

In accordance with some embodiments of the disclosed subject matter, a device for identifying an action, which is used for interactive control of an intelligent device, is provided, the device comprising: a processor; a memory for storing instructions executable by the processor; wherein the processor is configured to: record vibration trajectory information, wherein the vibration trajectory information corresponds to vibration of at least a portion of an intelligent device from a start of a vibration event to stabilization of the vibration event; determine whether the vibration is a damping vibration based on the vibration trajectory information; and in response to determining that the vibration is a damping vibration, determine that the vibration is caused by a user's trigger action, or in response to determining that the vibration is not a damping vibration, determining that the vibration is not caused by the user's trigger action.

In accordance with some embodiments of the disclosed subject matter, a non-transitory computer-readable storage medium having instructions thereon is provided, wherein the instructions, when executed by a processor, cause the processor to: record vibration trajectory information, wherein the vibration trajectory information corresponds to vibration of at least a portion of an intelligent device from a start of a vibration event to stabilization of the vibration event; determine whether the vibration is a damping vibration based on the vibration trajectory information; and response to determining that the vibration is a damping vibration, determine that the vibration is caused by a user's trigger action in the case that the vibration is damping vibration, or in response to determining that the vibration is not a damping vibration, determining that the vibration is not caused by the user's trigger action.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
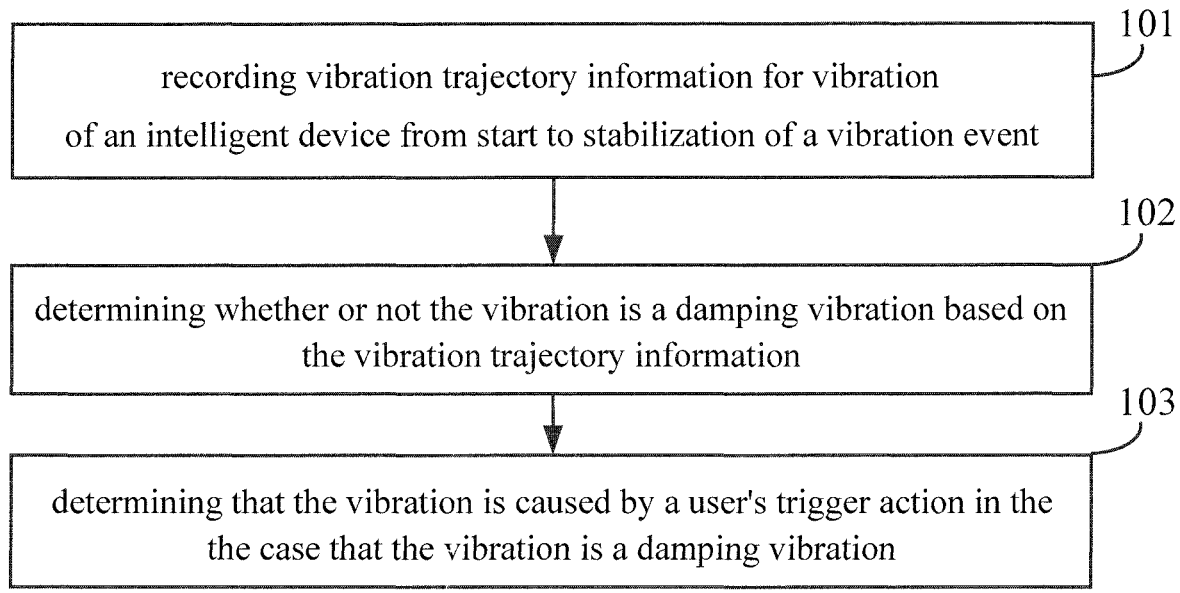
FIG. 1 is a flow chart of a process for identifying an action in accordance with some embodiments of the disclosed subject matter.

Hereinafter, exemplary embodiments will be described in detail, examples of which are shown in the drawings. The embodiments described in the following exemplary embodiments are not representative of all embodiments consistent with the present disclosure. Rather, they are merely examples of apparatuses and methods consistent with some aspects of the present disclosure as detailed in the appended claims.

In related art, techniques for achieving interactive control of an intelligent device mainly concentrate on utilization of a keyboard or a remote control. For example, an electrical fan is an essential object for many families, but human-machine interaction supported by current electric fans is limited to utilization of a keyboard or a remote control. The keyboard of such electric fans typically takes up a large part of a panel of the electrical fan and requires pressing of a particular button thereon to control the fan; and remote controls for electric fans are often misplaced so that they cannot be found by a user, and since it has smaller buttons, it is often difficult for the user to operate.

FIG. 1 is an example of a flow chart of a process for identifying an action in accordance with some embodiments of the disclosed subject matter. As shown in FIG. 1, the process is applicable to a device for identifying an action, which can be used for interactive control of an intelligent device. The process can include the following steps 101 to 103.

In step 101, vibration trajectory information for vibration of an intelligent device from a start of a vibration event to stabilization of the vibration event can be recorded.

Vibration intensity may vary depending on a position at which vibration trajectory information is recorded. Therefore, the position for recording vibration needs to be set in advance. In general, the position for recording vibration may be set at a position at which a trigger action is to be performed.

When the intelligent device itself receives a force from outside, the force may cause the intelligent device to vibrate. In some embodiments, the intelligent device can sense and record vibration trajectory information of an entire vibration event from start to stabilization thereof. In some embodiments, the vibration trajectory information can be collected by a sensor provided in the intelligent device. In some such embodiments, the vibration trajectory information can include position information of vibration points and corresponding timing information. The vibration may be vibration of the whole intelligent device or vibration of one or more components of the intelligent device. Here, the vibration event from start of vibration to stabilization of vibration can be a vibration event from a time at which the intelligent device starts to wobble to a time at which the intelligent device stops wobbling (or a time at which wobbling is no longer detectable), and the vibration trajectory information can be generated as information about the trajectory of the vibration over the course of the vibration event. In some embodiments, the vibration trajectory can be represented as a movement trajectory described by an x-axis corresponding to time and a y-axis corresponding to the amplitude of vibration, where a maximum point in the trajectory is a peak and a minimum point is a trough.

In step 102, a determination of whether or not the vibration is damping vibration can be made based on the vibration trajectory information.

In general, a damping vibration can be characterized as a vibration which is caused when a vibration system experiences friction force, dielectric resistance, and/or other energy consumption, and has its amplitude gradually reduced over time. Damping vibration is sometimes referred to as decrement vibration or attenuation vibration.

In some embodiments, the intelligent device can determine whether or not the vibration is damping vibration based on the vibration trajectory information. For example, the intelligent device can determine amplitude from the vibration trajectory information and determine whether or not it is damping vibration based on attenuation of the amplitude. Alternatively, the intelligent device can determine a distance between a peak and a trough in amplitude direction from the vibration trajectory information, and determine whether or not it is damping vibration according to attenuation of the distance. The process described in connection with FIG. 1 is not limited thereto.

In such manner, the device can determine whether or not the vibration is a damping vibration by determining attenuation of amplitude distances, which can be obtained without complicated calculations, which can improve calculation efficiency.

In step 103, the device can determine that the vibration is caused by a user's trigger action in the case that the vibration was determined to be a damping vibration.

In some embodiments, the user's trigger action can be performed on a preset area, which can be an area set on the device that is designated in advance, in which the user can perform a trigger action and the intelligent device can sense the action noticeably. In some embodiments, the sensor for sensing vibration can be set at a position corresponding to the preset area.

Figure 2:
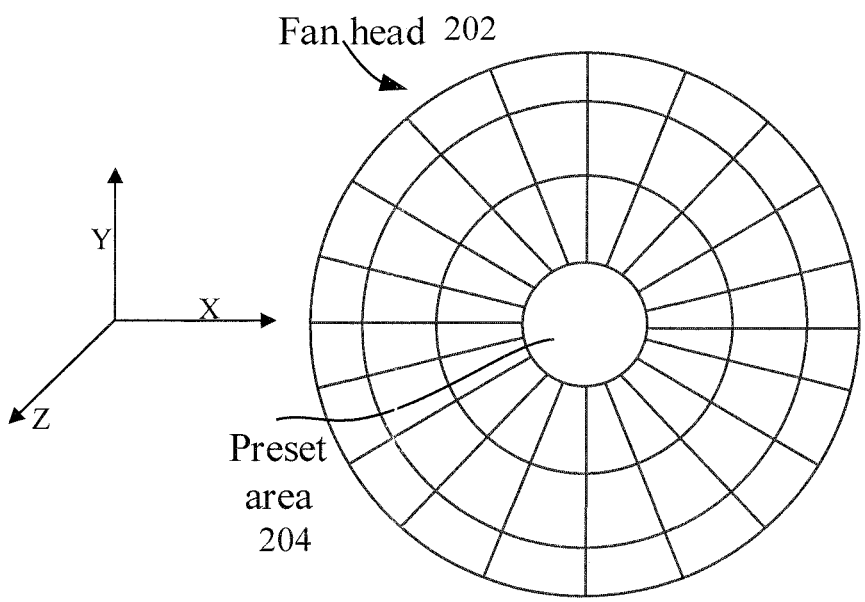
FIG. 2 is a schematic view of a fan head of an electrical fan in accordance with some embodiments of the disclosed subject matter.

In a particular example, the manufacturer of an electric fan can indicate (e.g., with a label on the fan, with instructions distributed with the fan, etc.) that a trigger action is to be performed on a front surface of a fan head 202, and can place a sensor for sensing vibration near the front surface of the fan head 202. Note that this is merely an example, and the preset area 204 can be located any position on a surface of the fan head 202 of the electrical fan accessible by the user, as shown in FIG. 2. If the preset area is located on the center of the surface facing the user, this can protect the user's hand from injury when the user performs a trigger action at this position. Additionally, the electrical fan can sense its maximum vibration. Note that, although fan blades are not shown in FIG. 2, this is merely a simplified example and is not an indication that there the fan head 202 includes no fan blades.

In some embodiments, upon determining that vibration is generated by the user's trigger action acting in the preset area, an operation corresponding to the trigger action can be performed, for example, to turn the intelligent device on/off, to adjust the speed of the device (e.g., by adjusting the speed at which a motor spins, by adjusting the gears of the device). In some embodiments, the trigger action can be any suitable action, such as a knock operation, a tap operation, etc. Note that these are merely examples, and any operation that can impart a force to the device and cause vibration of the device can be used as a triggering action.

In some embodiments, wobbling caused by other actions, such as wobbling caused by the user carrying the device, can be distinguished from the triggering action as other actions are less likely to cause a damping vibration.

In some embodiments, damping vibration can be caused by an impact force to the intelligent device (e.g., at or near the preset area), whereas vibrations caused by movement of the intelligent device are typically not damping vibrations. Accordingly, in some embodiments, the intelligent device can recognize that a particular vibration is caused by a user's trigger action, without requiring human-machine interaction by using keyboard or remote controller, which can improve the user's experience.

In some embodiments, the step 102 can include: acquiring, based on the vibration trajectory information, position information of the first n peaks and the first n troughs of the vibration trajectory information in time order, where n is a positive integer; determining, based on the position information of the first n peaks and the first n troughs, n amplitude distances between respective adjacent peaks and troughs in amplitude direction; and judging whether or not the first n amplitude distances are successively decreased in time order; wherein it is determined that the vibration is damping vibration in the case that the first n amplitude distances are successively decreased, and it is determined that the vibration is not damping vibration in the case that the first n amplitude distances are not successively decreased. In some embodiments, determining whether the vibration is damping vibration based on the amplitude distances can exclude vibrations caused by misoperations or environmental influences from being detected as user input, and can thus improve accuracy of action identification.

In some embodiments, determining first n amplitude distances between respective adjacent peaks and troughs in amplitude direction can include based on the position information of the first n peaks and the first n troughs can include: determining, based on the position information of the $i^{th}$ peak and the $i^{th}$ trough, the $i^{th}$ amplitude distance, where i is an integer from 1 to n, and n can be at least 4.

In some embodiments, judging whether or not the first n amplitude distances are successively decreased in time order can include: sorting the first n amplitude distances in time order; determine whether or not the $i^{th}$ amplitude distance is greater than the $(j+1)^{th}$ amplitude distance, where j is an integer from 1 to n−1; determining that the vibration is damping vibration in the case that first n−1 amplitude distances are all greater than their respective subsequent amplitude distances. If there is at least one amplitude distance among the n−1 amplitude distances that is smaller than or equal to its subsequent amplitude distance, it is considered that the vibration is not damping vibration.

For example, in the case where n=4, the first four amplitude distances are sorted in time forward order, and it is judged whether or not the first amplitude distance is greater than the second amplitude distance, whether the second amplitude distance is greater than the third amplitude distance, and whether the third amplitude distance is greater than the fourth amplitude distance. If yes for all of them, the vibration is judged to be damping vibration; if no for at least one of them, the vibration is judged to be not damping vibration.

In some embodiments, the judging whether or not the first n amplitude distances are successively decreased in time order can include: judging whether or not the first amplitude distance in the first n amplitude distances is greater than a preset distance; and judging whether or not the first n amplitude distances are successively decreased in the case that the first amplitude distance is greater than the preset distance.

In order to exclude damping vibration caused by accidental touch by a user or caused by ambient wind, it can be necessary to judge whether the first amplitude distance in time forward sequence is greater than the preset distance. In some embodiments, the preset distance can be set such that the first amplitude distance resulting from damping vibrations of relatively small power (e.g., resulting from an unintentional touch or ambient wind) are generally less than the preset distance.

It should be understood that when a user performs a trigger action on the fan, this can cause a large initial wobbling of the fan, and then the fan can wobble on its own with the amplitude of the wobble slowly narrowing until balance is achieved. Thus, the judgment described above can be carried out to avoid a false trigger caused when the user is wobbling the fan (e.g., by repositioning the fan) or carrying the fan (e.g., from one place to another).

In some embodiments, acquiring, based on the vibration trajectory information, position information of first n peaks and first n troughs of the vibration trajectory information in time order can include: acquiring the number of all the peaks and troughs of the vibration trajectory information; and acquiring the position information of first n peaks and first n troughs of the vibration trajectory information in time order in the case that the number of all the peaks and troughs is greater than or equal to 2n (e.g., if the number of peaks is less than 2n, the vibration trajectory information can be ignored as likely corresponding to a misoperation or environmental influence).

In order to further exclude damping vibration caused by accidental touch by a user or caused by ambient wind, it can be necessary to ensure that there is enough number of fluctuations in vibration, which can be based on a determination of the total measured number of peaks and troughs. In some embodiments, the intelligent device can ignore vibrations with less than a minimum number of peaks and troughs is less than a threshold to further exclude vibrations caused by misoperations or environmental influences.

In some embodiments, the step 101 can include: collecting vibration trajectory information for vibrations in a preset direction using a gravity sensor (e.g., implemented using an accelerometer).

In some embodiments, the preset direction is a direction set by the manufacturer in advance, and can be different for different devices. For example, in an electrical fan, the preset direction can be set such that a trigger action (such as knock, tap, etc.) is only allowed to be performed by a user on a surface (front surface) of the fan head 202 of the electrical fan facing the user side. In such an example, in order to simplify acquisition of vibration trajectory information, the intelligent device can acquire information at only a position expected to have a largest variation. In a more particular example, variation in position information of a location in the center of the front surface of the fan head 202 may be the largest and most useful (e.g., where the front surface of the fan head 202 is relatively flat). In general, the front surface can experience the largest vibrations in a direction parallel to a central axis of the fan head 202. Note that this is merely an example, and the preset direction can be any other suitable direction, such as the vertical direction (e.g., perpendicular to the central axis of the fan head 202). The present disclosure is not limited to sensing vibrations in any particular direction. In some embodiments, sensing vibrations along a direction that is expected to experience the largest vibrations can improve accuracy of action identification by acquiring only vibrations in the preset direction because vibrations in the preset direction are the largest.

In some embodiments, the step 103 can include: performing, in the case that the vibration is damping vibration, a trigger instruction corresponding to the vibration.

Figure 3:
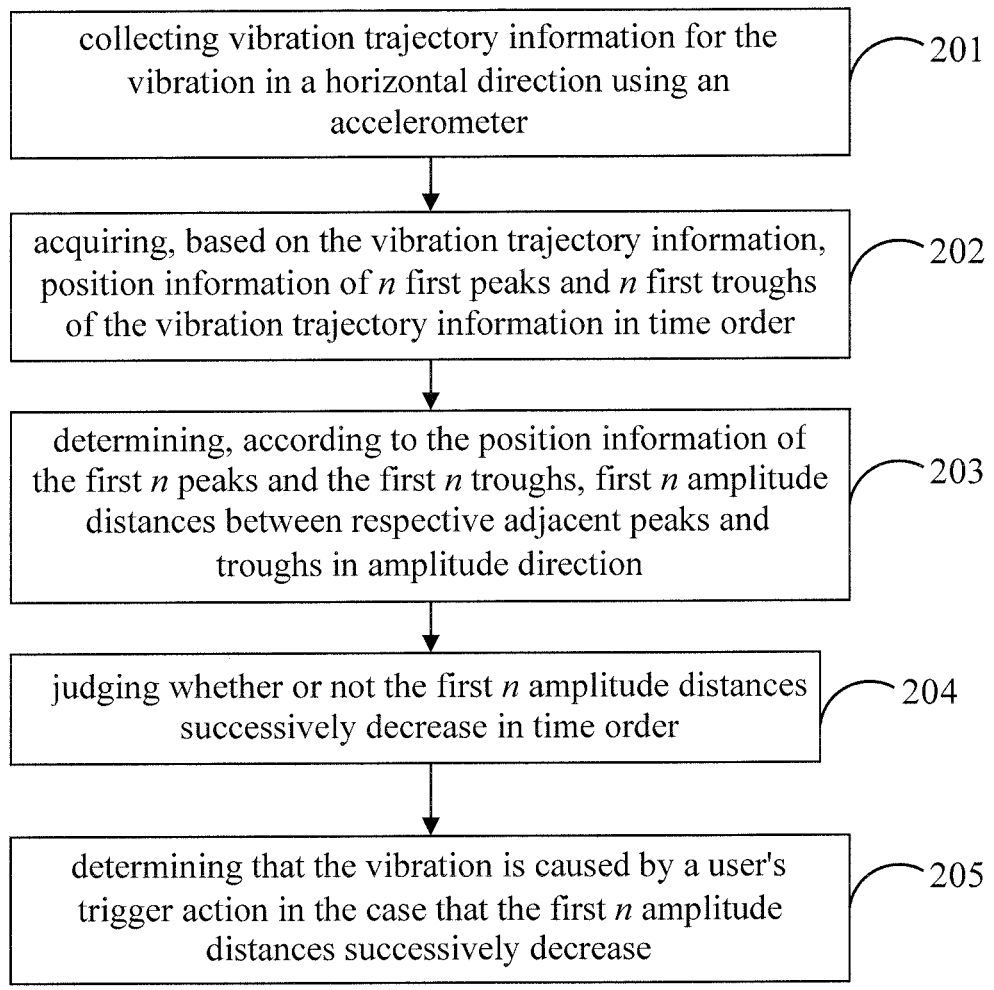
FIG. 3 is another flow chart of a process for identifying an action in accordance with some embodiments of the disclosed subject matter.

FIG. 3 is another flow chart of a process for identifying an action in accordance with some embodiments of the disclosed subject matter. As shown in FIG. 3, the process is applicable to a device for identifying an action, which can be used for intelligent interaction with an electrical fan. The process can include the following steps 201 to 205.

In step 201, vibration trajectory information of vibration in a horizontal direction (e.g., parallel to a central axis of a fan head, such as fan head 202) can collected by an accelerometer.

For the electrical fan, the preset direction is a horizontal direction (e.g., parallel to a central axis of a fan head, such as fan head 202).

In step 202, based on the vibration trajectory information, position information of first n peaks and first n troughs of the vibration trajectory information can be acquired in time order.

In step 203, according to the position information of the first n peaks and the first n troughs, first n amplitude distances between respective adjacent peaks and troughs in amplitude direction are determined.

In step 204, a judgment as to whether or not the first n amplitude distances successively decrease in time order can be made.

In step 205, in the case that the first n amplitude distances successively decrease, it can be determined that the vibration is generated by a user's trigger action in a preset area.

In some embodiments, device for identifying an action can determine that the vibration is damping vibration by successive decrease in the amplitude distances, and thus determine that the vibration is triggered by the user. This can facilitate human-machine interaction without requiring that the user interact with a keyboard or remote control and the user's experience can be improved.

Figure 4:
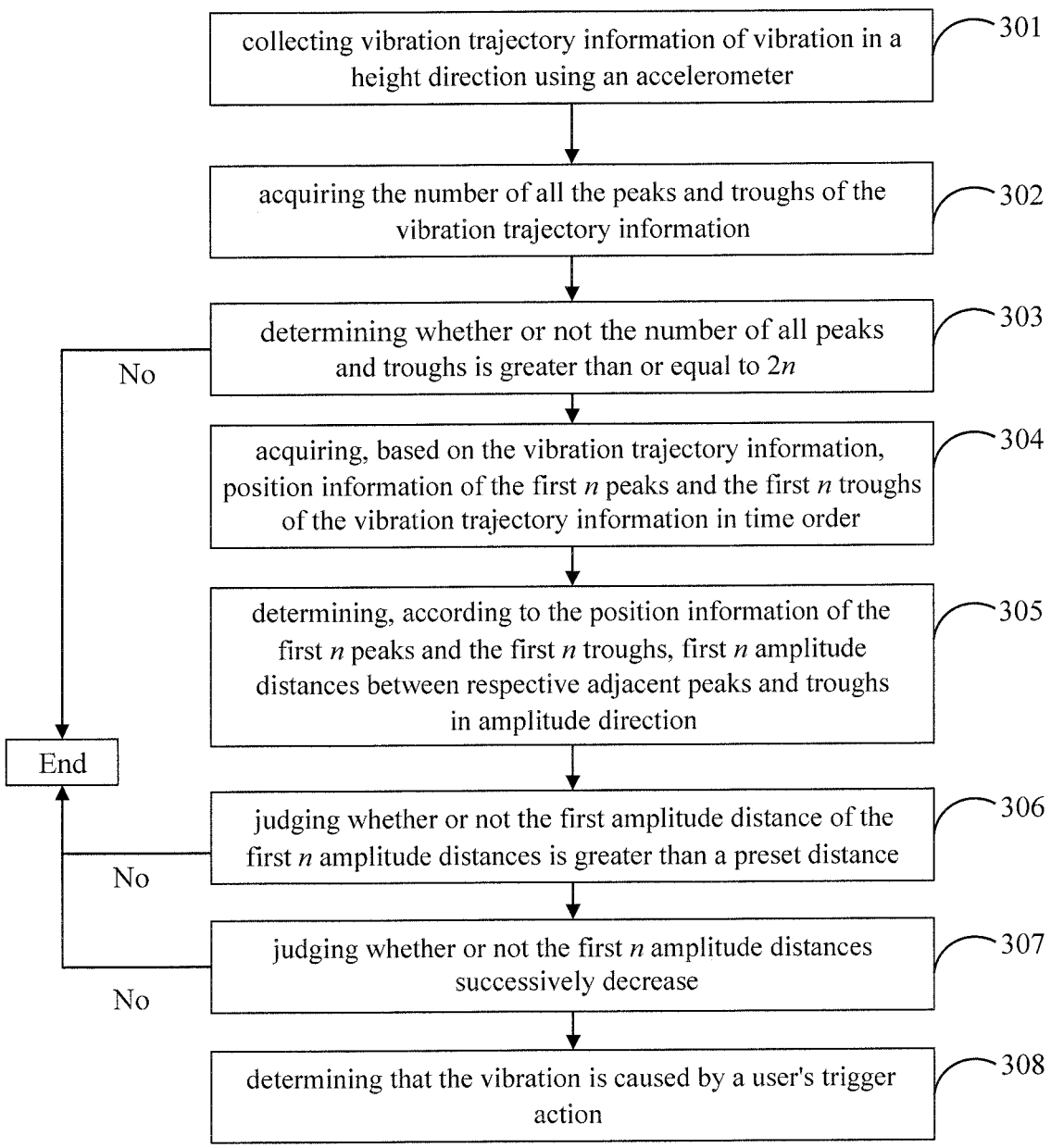
FIG. 4 is yet another flow chart of a process for identifying an action in accordance with some embodiments of the disclosed subject matter.

FIG. 4 is yet another flow chart of a process for identifying an action according to an exemplary embodiment. As shown in FIG. 4, the process is applicable to a device for identifying an action, which can be used for intelligent interaction with an electrical fan. The process can include the following steps 301 to 308.

In step 301, vibration trajectory information of vibration in a height direction (e.g., along the y-axis) with respect to the horizontal plane (e.g., the x-z plane in FIG. 2) can collected by an accelerometer.

For example, to collect vibration in a height direction for the electrical fan, the preset direction can be along the longitudinal axis of the electrical fan (e.g., parallel to the Y axis in FIG. 2).

In step 302, the number of all the peaks and troughs of the vibration trajectory information can be acquired.

In step 303, a determination as to whether the number of all the peaks and troughs is greater than or equal to 2n can be made. If yes at step 303, step 304 can be performed; if not, the process can be ended.

In step 304, position information of first n peaks and first n troughs of the vibration trajectory information can be acquired in time order.

In step 305, according to the position information of the first n peaks and the first n troughs, first n amplitude distances between respective adjacent peaks and troughs in amplitude direction can be determined.

In step 306, a judgment as to whether or not the first amplitude distance of the first n amplitude distances is greater than a preset distance can be made. If yes at 306, step 307 can be performed; if not, the process can be ended.

In step 307, a judgment as to whether or not the first n amplitude distances successively decrease in time order can be made. If yes at 307, step 308 can be performed; if not, the process can be ended.

In step 308, it can be determined that the vibration is generated by a user's trigger action.

In some embodiments, by setting conditions for the vibration, such as a minimum value of the first amplitude distance and a minimum number of peaks and troughs of the vibration, false triggers that occur when a user is wobbling the fan or carrying the fan can be ignored. This can increase the likelihood that the vibration was intentionally triggered by the user imparting a force to the fan, and thereby accuracy of action identification can be improved.

The following is an example of a device that can carry out processes described above in connection with some embodiments of the disclosed subject matter.

Figure 5:
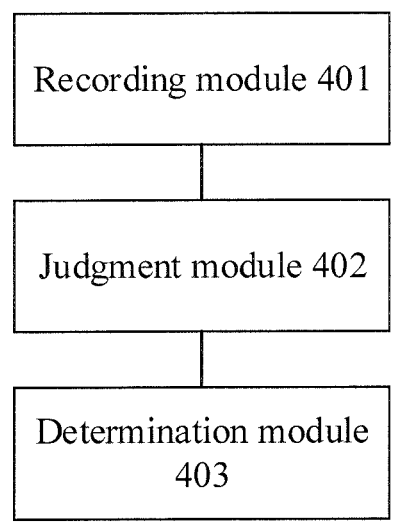
FIG. 5 is a block diagram of a device for identifying an action in accordance with some embodiments of the disclosed subject matter.

FIG. 5 is a block diagram of a device for identifying an action in accordance with some embodiments of the disclosed subject matter. In some embodiments, the device can be configured to interactively control an intelligent device, and can be implemented as part or all of an electronic device by software, hardware, or a combination of both. As shown in FIG. 5, the device for identifying an action can include: a recording module 401 configured to record vibration trajectory information for vibration of an intelligent device from start of a vibration event to stabilization of the vibration event; a judgment module 402 configured to determine whether or not the vibration event is damping vibration based on the vibration trajectory information; and a determination module 403 configured to determine that the vibration is caused by a user's trigger action in the case that the vibration is damping vibration.

In some embodiments, the intelligent device can generate a damping vibration in response to an impact force, whereas rather than vibration generated by movement of the intelligent device alone is unlikely to cause damping vibration. Accordingly, the intelligent device can recognize that the vibration is caused by a user's trigger action when a damping vibration event is detected, without requiring human-machine interaction by using a keyboard or remote control, and thus user's experience can be improved.

Figure 6:
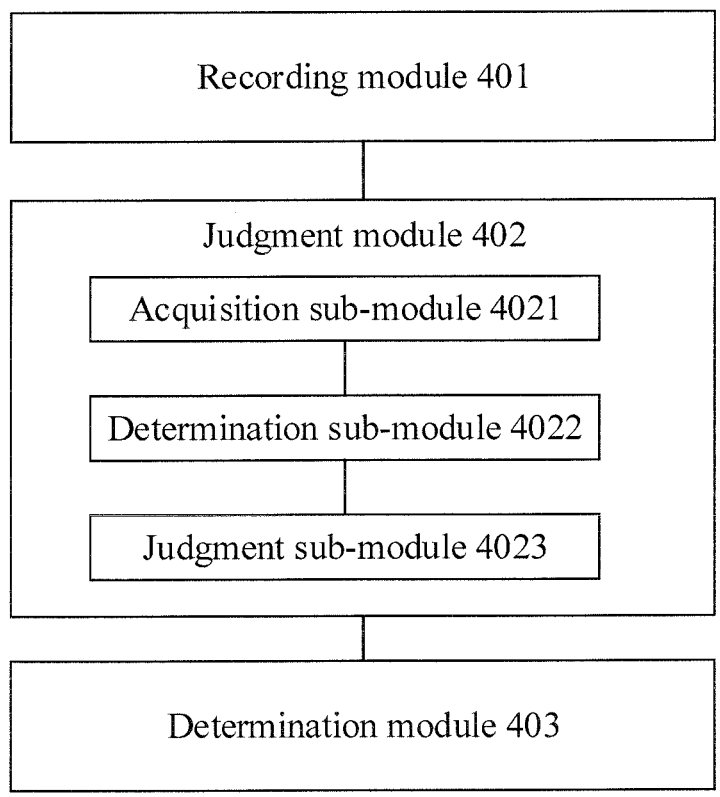
FIG. 6 is another block diagram of a device for identifying an action in accordance with some embodiments of the disclosed subject matter.

In some embodiments, as shown in FIG. 6, the judgment module 402 can include: an acquisition sub-module 4021 configured to acquire, based on the vibration trajectory information, position information of first n peaks and first n troughs of the vibration trajectory information in time order, where n is a positive integer; a determination sub-module 4022 configured to determine, according to the position information of the first n peaks and the first n troughs, first n amplitude distances between respective adjacent peaks and troughs in amplitude direction; and a judgment sub-module 4023 configured to judge whether or not the first n amplitude distances successively decrease in time order; and the judgment sub-module 4023 can determine that the vibration is damping vibration in the case that the first n amplitude distances are successively decreased, and can determine that the vibration is not damping vibration in the case that the first n amplitude distances do not successively decrease.

In some embodiments, the judgment sub-module 4023 can be configured to: judge whether or not the first amplitude distance of the first n amplitude distances is greater than a preset distance; and judge whether or not the first n amplitude distances are successively decreased in the case that the first amplitude distance is greater than the preset distance, and determine that the vibration does not correspond to a user's trigger action in the case that the first amplitude distance is less than or equal to the preset distance.

In some embodiments, the acquisition sub-module 4021 can be configured to: acquire the number of all the peaks and troughs of the vibration trajectory information; and acquire the position information of first n peaks and first n troughs of the vibration trajectory information in time order in the case that the number of all the peaks and troughs is greater than or equal to 2n, and determine that the vibration does not correspond to a user's trigger action in the case that the number of all the peaks and troughs is less than 2n.

Figure 7:
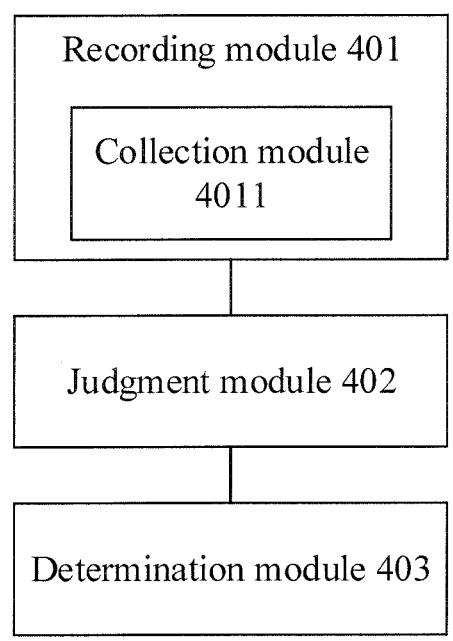
FIG. 7 is yet another block diagram of a device for identifying an action in accordance with some embodiments of the disclosed subject matter.

In some embodiments, as shown in FIG. 7, the recording module 401 can include: a collection sub-module 4011 configured to collect vibration trajectory information for the vibration in a preset direction by using an accelerometer (e.g., to implement a gravity sensor).

In some embodiments, there is provided a device for identifying an action, which is used for interactive control of an intelligent device. The device includes: a processor; a memory for storing instructions executable by the processor, wherein the processor is configured to: record vibration trajectory information for vibration of an intelligent device from start to stabilization of the vibration; determine whether or not the vibration is damping vibration based on the vibration trajectory information; and determine that the vibration is caused by a user's trigger action in the case that the vibration is damping vibration.

The processor may be configured to: acquire, based on the vibration trajectory information, position information of first n peaks and first n troughs of the vibration trajectory information in time order, wherein n is a positive integer; determine, according to the position information of the first n peaks and the first n troughs, first n amplitude distances between respective adjacent peaks and troughs in amplitude direction; and judging whether or not the first n amplitude distances are successively decreased in time order, wherein it is determined that the vibration is damping vibration in the case that the first n amplitude distances are successively decreased, and it is determined that the vibration is not damping vibration in the case that the first n amplitude distances are not successively decreased.

The judging whether or not the first n amplitude distances are successively decreased in time order may include: judging whether or not the first amplitude distance in the first n amplitude distances is greater than a preset distance; and judging whether or not the first n amplitude distances are successively decreased in the case that the first amplitude distance is greater than the preset distance.

The acquiring, based on the vibration trajectory information, position information of first n peaks and first n troughs of the vibration trajectory information in time order may include: acquiring the number of all the peaks and troughs of the vibration trajectory information; and acquiring the position information of first n peaks and first n troughs of the vibration trajectory information in time order in the case that the number of all the peaks and troughs is greater than or equal to 2n.

The recording vibration trajectory information for vibration of an intelligent device from start to stabilization of the vibration may include: collecting vibration trajectory information for the vibration in a preset direction by using a gravity sensor.

With respect to the devices of the above embodiments, the specific mode in which each module performs the operation has been described in detail in the embodiment relating to the process, and the description thereof will not be described in detail herein.

Figure 8:
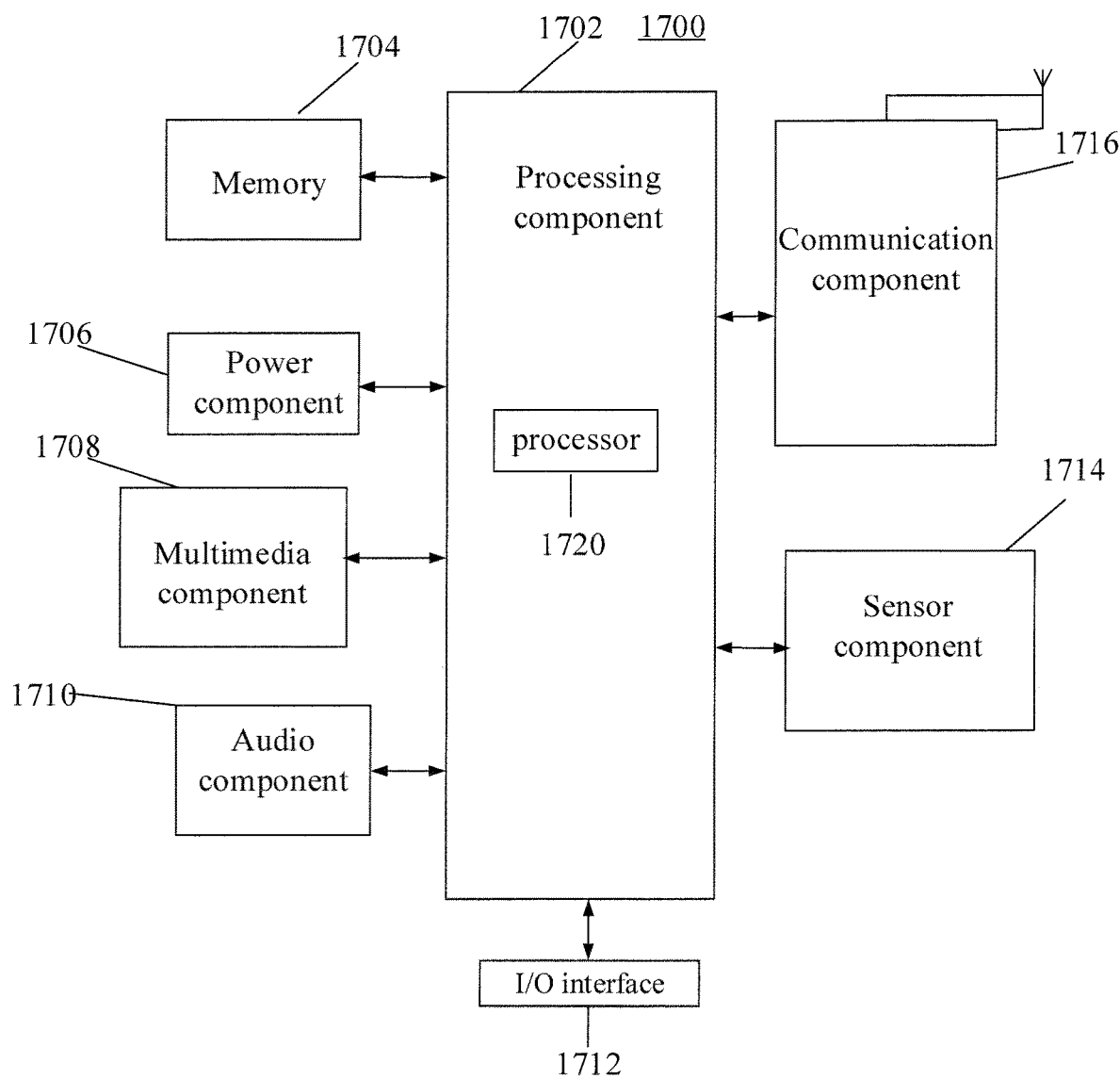
FIG. 8 is still another block diagram of a device for identifying an action in accordance with some embodiments of the disclosed subject matter.

FIG. 8 is a block diagram of a device for identifying an action in accordance with some embodiments of the disclosed subject matter. In some embodiments, the device can be a terminal device. For example, the device 1700 may be a mobile phone, a computer, a digital broadcast terminal, a messaging device, a gaming console, a tablet, a medical device, an exercise equipment, a personal digital assistant, and the like.

In some embodiments, the device 1700 can include one or more of the following components: a processing component 1702, a memory 1704, a power 1706, a multimedia component 1708, an audio component 1710, an input/output (I/O) interface 1712, a sensor component 1714, and a communication component 1716.

In some embodiments, the processing component 1702 can control overall operations of the device 1700, such as operations associated with display, telephone calls, data communications, camera operations, and/or recording operations. In some embodiments, the processing component 1702 can include one or more processors 1720 to execute instructions to perform all or part of the steps in the processes described above in connection with FIGS. 1, 3 and 4. Additionally, in some embodiments, the processing component 1702 can include one or more modules which facilitate the interaction between the processing component 1702 and other components. For example, the processing component 1702 can include a multimedia module to facilitate the interaction between the multimedia 1708 and the processing component 1702.

In some embodiments, the memory 1704 can be configured to store various types of data to support the operation of the device 1700. Examples of such data include instructions for any applications or processes operated on the device 1700, contact data, phonebook data, messages, pictures, video, etc. The memory 1704 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

In some embodiments, the power component 1706 can provide power to various components of the device 1700. The power component 1706 may include a power management system, one or more power sources, and any other components associated with the generation, management, and distribution of power in the device 1700.

In some embodiments, the multimedia component 1708 can include a screen providing an output interface between the device 1700 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swiping action, but also can sense a period of time and a pressure associated with the touch or swiping action. In some embodiments, the multimedia component 1708 includes a front camera and/or a rear camera. The front camera and the rear camera can receive an external multimedia datum while the device 1700 is in an operation mode, such as a photographing mode or a video mode. Each of the front camera and the rear camera can be a fixed optical lens system or have focus and optical zoom capability.

In some embodiments, the audio component 1710 can be configured to output and/or input audio signals. For example, the audio component 1710 can include a microphone ("MIC") configured to receive an external audio signal when the device 1700 is in an operation mode, such as a call mode, a recording mode, and a voice recognition mode. The received audio signal can be further stored in the memory 1704 or transmitted via the communication component 1716. In some embodiments, the audio component 1710 further includes a speaker to output audio signals.

In some embodiments, the I/O interface 1712 can provide an interface between the processing component 1702 and peripheral interface modules, such as a keyboard, a click wheel, buttons, etc. The buttons can include, but are not limited to, a home button, a volume button, a starting button, and a locking button.

In some embodiments, the sensor component 1714 can include one or more sensors to provide status assessments of various aspects of the device 1700. For example, the sensor component 1714 can detect an open/closed status of the device 1700, relative positioning of components of the device (e.g., the display and the keypad). In some embodiments, sensor component 1714 can further detect a change in position of the device 1700 or a component of the device 1700, a presence or absence of user contact with the device 1700, an orientation or an acceleration/deceleration of the device 1700, and a change in temperature of the device 1700. In some embodiments, the sensor component 1714 can include a proximity sensor configured to detect the presence of nearby objects without any physical contact. In some embodiments, the sensor component 1714 can include a light sensor, such as a CMOS or CCD image sensor, for use in imaging applications. Additionally or alternatively, in some embodiments, the sensor component 1714 can include an accelerometer sensor, a gyroscope sensor, a magnetic sensor, a pressure sensor, and/or a temperature sensor.

In some embodiments, the communication component 1716 can be configured to facilitate communication, wired and/or wirelessly, between the device 1700 and other devices. For example, the device 1700 can access a wireless network based on a communication standard, such as WiFi, 2G, or 3G, or a combination thereof. In some embodiments, the communication component 1716 can receive a broadcast signal or broadcast associated information from an external broadcast management system via a broadcast channel. In some embodiments, the communication component 1716 can further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 1700 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, other electronic components, or combinations thereof, for performing the above described processes.

In some embodiments, a non-transitory computer-readable storage medium is provided that includes instructions, such as included in the memory 1704, executable by the processor 1720 in the device 1700, for performing the above-described processes. For example, the non-transitory computer-readable storage medium may can a ROM, a RAM, a CD-ROM, a magnetic tape, a floppy disc, an optical data storage device, any other suitable non-transitory computer-readable medium, or combinations thereof.

A non-transitory computer-readable storage medium can enable the device 1700 to perform the process for identifying an action when the instructions in the storage medium are executed by the processor of the device 1700. In some embodiments, the process includes: recording vibration trajectory information for vibration of an intelligent device from start to stabilization of the vibration; judging whether or not the vibration is damping vibration based on the vibration trajectory information; and determining that the vibration is caused by a user's trigger action in the case that the vibration is damping vibration.

In some embodiments, the judging whether or not the vibration is damping vibration based on the vibration trajectory information can include: acquiring, based on the vibration trajectory information, position information of first n peaks and first n troughs of the vibration trajectory information in time order, wherein n is a positive integer; determining, according to the position information of the first n peaks and the first n troughs, first n amplitude distances between respective adjacent peaks and troughs in amplitude direction; and judging whether or not the first n amplitude distances successively decrease in time order, wherein it is determined that the vibration is damping vibration in the case that the first n amplitude distances are successively decreased, and it is determined that the vibration is not damping vibration in the case that the first n amplitude distances do not successively decrease.

In some embodiments, the judging whether or not the first n amplitude distances successively decrease in time order can include: judging whether or not the first amplitude distance in the first n amplitude distances is greater than a preset distance; and judging whether or not the first n amplitude distances successively decrease in the case that the first amplitude distance is greater than the preset distance.

In some embodiments, the acquiring, based on the vibration trajectory information, position information of first n peaks and first n troughs of the vibration trajectory information in time order can include: acquiring the number of all the peaks and troughs of the vibration trajectory information; and acquiring the position information of first n peaks and first n troughs of the vibration trajectory information in time order in the case that the number of all the peaks and troughs is greater than or equal to 2n.

In some embodiments, the recording vibration trajectory information for vibration of an intelligent device from start of a vibration event to stabilization of the vibration event can include: collecting vibration trajectory information for the vibration in a preset direction by using an accelerometer.

Other embodiments of the present disclosure will be readily apparent to those skilled in the art upon consideration of the specification and practice of the disclosure disclosed herein. The present application is intended to cover any variations, uses, or adaptations of the present disclosure that follow the general principles of the present disclosure and include the common general knowledge or conventional technical means in the art without departing from the present disclosure The specification and examples are to be regarded as illustrative only, and the true scope and spirit of the disclosure is indicated by the following claims. It should be understood that the above described steps of the processes of FIGS. 3 and 4 can be executed or performed in any order or sequence not limited to the order and sequence shown and described in the figures. Also, some of the above steps of the processes of FIGS. 3 and 4 can be executed or performed substantially simultaneously where appropriate or in parallel to reduce latency and processing times.

It is to be understood that this disclosure is not limited to the precise constructions described above and shown in the accompanying drawings, and that various modifications and changes may be made without departing from the scope thereof. The scope of the present disclosure is limited only by the appended claims.

What is claimed is:

1. A method for identifying an action, which is used for interactive control of an intelligent device, comprising:
   recording vibration trajectory information, wherein the vibration trajectory information corresponds to vibration of at least a portion of the intelligent device from a start of a vibration event to stabilization of the vibration event;
   determining whether the vibration is a damping vibration based on the vibration trajectory information; and
   in response to determining that the vibration is the damping vibration, determining that the vibration is caused by a user's trigger action, or in response to determining that the vibration is not the damping vibration, determining that the vibration is not caused by the user's trigger action,
   wherein determining whether the vibration is the damping vibration based on the vibration trajectory information comprises:
   determining, based on the vibration trajectory information, position information of n first peaks and n first troughs of the vibration trajectory information in time order, wherein n is a positive integer greater than 1;
   determining, based on the position information of the n first peaks and the n first troughs, n first amplitude distances between respective adjacent peaks and troughs in amplitude direction;
   determining whether the n first amplitude distances successively decrease in time order; and
   in response to determining that the n first amplitude distances successively decrease in time order, determining that the vibration is the damping vibration, or in response to determining that at least one of the n first amplitude distances does not successively decrease in time order, determining that the vibration is not the damping vibration.

2. The method according to claim 1, wherein the determining whether the n first amplitude distances successively decrease in time order comprises:
   determining that the first amplitude distance of the n first amplitude distances is greater than a preset distance; and
   in response to determining that the first amplitude distance is greater than the preset distance, performing the determining whether the n first amplitude distances successively decrease in time order.

3. The method according to claim 1, wherein the determining, based on the vibration trajectory information, position information of the n first peaks and the n first troughs of the vibration trajectory information in time order comprises:
   determining the total number of all peaks and troughs represented in the vibration trajectory information;
   determining that the total number of all the peaks and the troughs represented in the vibration trajectory information is greater than or equal to 2n; and
   in response to determining that the total number of all the peaks and the troughs represented in the vibration trajectory information is greater than or equal to 2n, performing the determining the position information of the n first peaks and the n first troughs of the vibration trajectory information in time order.

4. The method according to claim 1, wherein the recording vibration trajectory information comprises:
   collecting, using an accelerometer, vibration trajectory information vibrations in a preset direction.

5. The method according to claim 4, wherein the intelligent device is an electric fan comprising a fan head that rotates about a central axis.

6. The method according to claim 5, wherein the preset direction is a direction parallel to the central axis.

7. The method according to claim 5, further comprising in response to determining that the vibration is caused by the user's trigger action, performing an operation to toggle a power state of the electric fan.

8. The method according to claim 5, further comprising in response to determining that the vibration is caused by the user's trigger action, performing an operation to change a speed at which the fan head rotates about the central axis.

9. A device for identifying an action, which is used for interactive control of an intelligent device, comprising:
   a processor;
   a memory for storing instructions executable by the processor;
   wherein the processor is configured to:
   record vibration trajectory information, wherein the vibration trajectory information corresponds to vibration of at least a portion of the intelligent device from a start of a vibration event to stabilization of the vibration event;
   determine whether the vibration is a damping vibration based on the vibration trajectory information; and
   in response to determining that the vibration is the damping vibration, determine that the vibration is caused by a user's trigger action, or in response to determining that the vibration is not the damping vibration, determining that the vibration is not caused by the user's trigger action, wherein the processor is further configured to:
determine, based on the vibration trajectory information, position information of n first peaks and n first troughs of the vibration trajectory information in time order, wherein n is a positive integer greater than 1;
determine, based on the position information of the n first peaks and the n first troughs, n first amplitude distances between respective adjacent peaks and troughs in amplitude direction;
determine whether the n first amplitude distances successively decrease in time order; and
in response to determining that the n first amplitude distances successively decrease in time order, determine that the vibration is the damping vibration, or in response to determining that at least one of the n first amplitude distances does not successively decrease in time order, determine that the vibration is not the damping vibration.

10. The device according to claim 9, wherein the processor is further configured to:
determine that the first amplitude distance of the n first amplitude distances is greater than a preset distance; and
in response to determining that the first amplitude distance is greater than the preset distance, determine whether the n first amplitude distances successively decrease in time order.

11. The device according to claim 9, wherein the processor is further configured to:
determine the total number of all peaks and troughs represented in the vibration trajectory information;
determine that the total number of all the peaks and the troughs represented in the vibration trajectory information is greater than or equal to 2n; and
in response to determining that the total number of all the peaks and the troughs represented in the vibration trajectory information is greater than or equal to 2n, determine the position information of the n first peaks and the n first troughs of the vibration trajectory information in time order.

12. The device according to claim 9, wherein the device further comprises an accelerometer, and wherein the processor is configured to:
collect, using the accelerometer, vibration trajectory information for the vibration in a preset direction by using a gravity sensor.

13. The device according to claim 9, wherein the intelligent device is an electric fan comprising a fan head that rotates about a central axis.

14. A non-transitory computer-readable storage medium having instructions thereon, the instructions, when executed by a processor, cause the processor to:
record vibration trajectory information, wherein the vibration trajectory information corresponds to vibration of at least a portion of an intelligent device from a start of a vibration event to stabilization of the vibration event;
determine whether the vibration is a damping vibration based on the vibration trajectory information; and response to determining that the vibration is the damping vibration, determine that the vibration is caused by a user's trigger action in the case that the vibration is the damping vibration, or in response to determining that the vibration is not the damping vibration, determining that the vibration is not caused by the user's trigger action, wherein determining whether the vibration is the damping vibration based on the vibration trajectory information further causes the processor to:
determine, based on the vibration trajectory information, position information of n first peaks and n first troughs of the vibration trajectory information in time order, wherein n is a positive integer greater than 1;
determine, based on the position information of the n first peaks and the n first troughs, n first amplitude distances between respective adjacent peaks and troughs in amplitude direction;
determine whether the n first amplitude distances successively decrease in time order; and
in response to determining that the n first amplitude distances successively decrease in time order, determine that the vibration is the damping vibration, or in response to determining that at least one of the n first amplitude distances does not successively decrease in time order, determine that the vibration is not the damping vibration.

15. The non-transitory computer-readable storage medium having instructions thereon according to claim 14, wherein the determining whether the n first amplitude distances successively decrease in time order comprises:
determining that the first amplitude distance of the n first amplitude distances is greater than a preset distance; and
in response to determining that the first amplitude distance is greater than the preset distance, performing the determining whether the n first amplitude distances successively decrease in time order.

16. The non-transitory computer-readable storage medium having instructions thereon according to claim 14, wherein the determining, based on the vibration trajectory information, position information of the n first peaks and the n first troughs of the vibration trajectory information in time order comprises:
determining the total number of all peaks and troughs represented in the vibration trajectory information;
determining that the total number of all the peaks and the troughs represented in the vibration trajectory information is greater than or equal to 2n; and
in response to determining that the total number of all the peaks and the troughs represented in the vibration trajectory information is greater than or equal to 2n, performing the determining the position information of the n first peaks and the n first troughs of the vibration trajectory information in time order.

17. The non-transitory computer-readable storage medium having instructions thereon according to claim 14, wherein the recording vibration trajectory information comprises: collecting, using an accelerometer, vibration trajectory information vibrations in a preset direction.

* * * * *